(12) United States Patent
Ngo et al.

(10) Patent No.: US 10,983,942 B1
(45) Date of Patent: Apr. 20, 2021

(54) MULTI-MASTER HYBRID BUS APPARATUS

(71) Applicant: Qorvo US, Inc., Greensboro, NC (US)

(72) Inventors: Christopher Truong Ngo, Oueen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/710,457

(22) Filed: Dec. 11, 2019

(51) Int. Cl.
*G06F 13/40* (2006.01)
*H04L 12/40* (2006.01)
*G06F 3/06* (2006.01)
*H04L 29/06* (2006.01)

(52) U.S. Cl.
CPC ........ *G06F 13/4027* (2013.01); *G06F 3/0661* (2013.01); *H04L 12/40032* (2013.01); *H04L 12/40163* (2013.01); *H04L 29/06068* (2013.01)

(58) Field of Classification Search
CPC .............. G06F 3/0661; G06F 13/4027; H04L 12/40032; H04L 12/40163; H04L 29/06068; H04L 29/06224
See application file for complete search history.

(56) References Cited

U.S. PATENT DOCUMENTS

| | | | |
|---|---|---|---|
| 3,953,835 A | 4/1976 | Cuccio et al. | |
| 5,412,644 A | 5/1995 | Herberle | |
| 5,459,660 A | 10/1995 | Berra | |
| 5,621,897 A | 4/1997 | Boury et al. | |
| 5,684,803 A | 11/1997 | Nguyen Thuy | |
| 5,734,847 A | 3/1998 | Garbus et al. | |
| 5,774,680 A | 6/1998 | Wanner et al. | |
| 5,787,132 A | 7/1998 | Kishigami et al. | |
| 5,832,207 A | 11/1998 | Little et al. | |
| 5,978,860 A | 11/1999 | Chan et al. | |
| 6,094,699 A | 7/2000 | Surugucchi et al. | |
| 6,141,708 A | 10/2000 | Tavallaei et al. | |
| 6,189,063 B1 | 2/2001 | Rekeita et al. | |
| 6,292,705 B1* | 9/2001 | Wang .................. | G06F 12/0822 700/5 |

(Continued)

OTHER PUBLICATIONS

Non-Final Office Action for U.S. Appl. No. 14/575,491, dated May 26, 2017, 20 pages.

(Continued)

*Primary Examiner* — Glenn A. Auve
(74) *Attorney, Agent, or Firm* — Withrow & Terranova, P.L.L.C.

(57) ABSTRACT

A multi-master hybrid bus apparatus is provided. The multi-master hybrid bus apparatus includes a hybrid bus bridge circuit configured to couple multiple master circuits with one or more slave circuits via heterogeneous communication buses. In examples discussed herein, the multiple master circuits can correspond to multiple physically separated master circuits or multiple bus ports provided in a single master circuit. In a non-limiting example, the hybrid bus bridge circuit is coupled to the multiple master circuits via multiple radio frequency front-end (RFFE) buses and to the slave circuits via at least one single-wire bus (SuBUS) consisting of a single wire. By bridging the multiple master circuits to the slave circuits based on a single hybrid bus bridge circuit, it may be possible to enable flexible heterogeneous bus deployment in an electronic device (e.g., a smartphone) with reduced cost and/or footprint.

20 Claims, 4 Drawing Sheets

(56) References Cited

U.S. PATENT DOCUMENTS

| | | | |
|---|---|---|---|
| 6,308,255 B1* | 10/2001 | Gorishek, IV | G06F 9/3879 710/104 |
| 6,360,291 B1 | 3/2002 | Tavallaei | |
| 6,397,279 B1 | 5/2002 | Jaramillo et al. | |
| 6,408,163 B1 | 6/2002 | Fik | |
| 6,484,268 B2 | 11/2002 | Tamura et al. | |
| 6,985,990 B2 | 1/2006 | Bronson et al. | |
| 7,197,589 B1 | 3/2007 | Deneroff et al. | |
| 7,519,005 B2 | 4/2009 | Hejdeman et al. | |
| 7,685,320 B1 | 3/2010 | Wishneusky | |
| 7,729,427 B2 | 6/2010 | Kwok | |
| 8,509,318 B2 | 8/2013 | Tailliet | |
| 8,775,707 B2 | 7/2014 | Poulsen | |
| 9,252,900 B2 | 2/2016 | Poulsen | |
| 9,430,321 B2 | 8/2016 | Slik | |
| 9,519,612 B2 | 12/2016 | Hietala et al. | |
| 9,569,386 B2 | 2/2017 | Du | |
| 9,639,500 B2 | 5/2017 | Bas et al. | |
| 9,652,451 B2 | 5/2017 | Elder | |
| 9,690,725 B2 | 6/2017 | Sengoku | |
| 9,755,821 B2 | 9/2017 | Jang et al. | |
| 9,946,677 B2 | 4/2018 | Hapke | |
| 10,176,130 B2 | 1/2019 | Ngo et al. | |
| 10,185,683 B2 | 1/2019 | Ngo et al. | |
| 10,599,601 B1 | 3/2020 | Ngo et al. | |
| 2001/0050713 A1 | 12/2001 | Kubo et al. | |
| 2004/0049619 A1 | 3/2004 | Lin | |
| 2004/0100400 A1 | 5/2004 | Perelman et al. | |
| 2004/0128594 A1 | 7/2004 | Elmhurst et al. | |
| 2004/0221067 A1 | 11/2004 | Huang et al. | |
| 2005/0012492 A1 | 1/2005 | Mihalka | |
| 2005/0185665 A1 | 8/2005 | Uboldi | |
| 2006/0031618 A1 | 2/2006 | Hansquine et al. | |
| 2006/0050694 A1 | 3/2006 | Bury et al. | |
| 2006/0152236 A1 | 7/2006 | Kim | |
| 2006/0236008 A1 | 10/2006 | Asano et al. | |
| 2009/0121825 A1 | 5/2009 | Har | |
| 2009/0248932 A1 | 10/2009 | Taylor et al. | |
| 2010/0305723 A1* | 12/2010 | Koyama | H04L 12/40039 700/90 |
| 2010/0306430 A1* | 12/2010 | Takahashi | G06F 13/4059 710/107 |
| 2011/0035632 A1 | 2/2011 | Hong et al. | |
| 2011/0113171 A1 | 5/2011 | Radhakrishnan et al. | |
| 2012/0027104 A1 | 2/2012 | Bas et al. | |
| 2012/0030753 A1 | 2/2012 | Bas et al. | |
| 2012/0226965 A1 | 9/2012 | Hammerschmidt et al. | |
| 2012/0303836 A1 | 11/2012 | Ngo et al. | |
| 2013/0054850 A1 | 2/2013 | Co | |
| 2013/0124763 A1 | 5/2013 | Kessler | |
| 2013/0132624 A1 | 5/2013 | Chen et al. | |
| 2013/0166801 A1* | 6/2013 | Chun | G06F 13/4059 710/110 |
| 2013/0197920 A1 | 8/2013 | Lesso et al. | |
| 2013/0265884 A1 | 10/2013 | Brombal et al. | |
| 2013/0301689 A1 | 11/2013 | Marchand et al. | |
| 2014/0025999 A1 | 1/2014 | Kessler | |
| 2014/0112339 A1 | 4/2014 | Safranek et al. | |
| 2014/0304442 A1 | 10/2014 | Hietala et al. | |
| 2014/0310436 A1* | 10/2014 | Du | G06F 13/4295 710/110 |
| 2014/0376278 A1 | 12/2014 | Fornage et al. | |
| 2015/0056941 A1 | 2/2015 | Lin et al. | |
| 2015/0074306 A1 | 3/2015 | Ayyagari et al. | |
| 2015/0106541 A1 | 4/2015 | Southcombe et al. | |
| 2015/0127862 A1 | 5/2015 | Fan et al. | |
| 2015/0149673 A1 | 5/2015 | Balkan et al. | |
| 2015/0169482 A1 | 6/2015 | Ngo et al. | |
| 2015/0192974 A1 | 7/2015 | Ngo et al. | |
| 2015/0193297 A1 | 7/2015 | Ngo et al. | |
| 2015/0193298 A1 | 7/2015 | Ngo et al. | |
| 2015/0193321 A1 | 7/2015 | Ngo et al. | |
| 2015/0193373 A1 | 7/2015 | Ngo et al. | |
| 2016/0050513 A1 | 2/2016 | Wang et al. | |
| 2016/0124892 A1 | 5/2016 | Amarillo et al. | |
| 2017/0255250 A1 | 9/2017 | Ngo et al. | |
| 2017/0255578 A1 | 9/2017 | Ngo et al. | |
| 2017/0255579 A1 | 9/2017 | Ngo et al. | |
| 2017/0277651 A1 | 9/2017 | Ngo et al. | |
| 2018/0217959 A1 | 8/2018 | Ngo et al. | |
| 2020/0151131 A1* | 5/2020 | Ngo | G06F 13/4027 |
| 2020/0394046 A1 | 12/2020 | Snelgrove et al. | |

OTHER PUBLICATIONS

Non-Final Office Action for U.S. Appl. No. 14/659,379, dated Apr. 7, 2017, 37 pages.

Author Unknown, "1-Wire," Wikipedia, last modified Jan. 16, 2015, accessed Feb. 12, 2015, http://en.wikipedia.org/wiki/1-Wire, 4 pages.

Author Unknown, "DS1822: Econo 1-Wire Digital Thermometer," Maxim Integrated, 2007, 21 pages.

Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).

Awtry, Dan, et al., "Design Guide v1.0," Springbok Digitronics, Aug. 19, 2004, 96 pages.

Non-Final Office Action for U.S. Appl. No. 14/575,491, dated Nov. 30, 2017, 18 pages.

Non-Final Office Action for U.S. Appl. No. 14/659,292, dated Sep. 29, 2017, 27 pages.

Final Office Action for U.S. Appl. No. 14/659,292, dated Apr. 30, 2018, 24 pages.

Non-Final Office Action for U.S. Appl. No. 14/659,328, dated Sep. 8, 2017, 51 pages.

Final Office Action for U.S. Appl. No. 14/659,328, dated Mar. 20, 2018, 61 pages.

Notice of Allowance for U.S. Appl. No. 14/659,328, dated Jul. 2, 2018, 8 pages.

Non-Final Office Action for U.S. Appl. No. 14/659,355, dated Sep. 20, 2017, 32 pages.

Final Office Action for U.S. Appl. No. 14/659,355, dated Apr. 17, 2018, 11 pages.

Advisory Action for U.S. Appl. No. 14/659,355, dated Jul. 5, 2018, 3 pages.

Non-Final Office Action for U.S. Appl. No. 15/467,790, dated Jun. 28, 2018, 14 pages.

Ex Parte Quayle Action for U.S. Appl. No. 15/365,315, dated Jul. 26, 2018, 7 pages.

Final Office Action for U.S. Appl. No. 14/659,379, dated Oct. 18, 2017, 44 pages.

Advisory Action for U.S. Appl. No. 14/659,379, dated Feb. 26, 2018, 3 pages.

Notice of Allowance for U.S. Appl. No. 14/659,379, dated Mar. 20, 2018, 10 pages.

Non-Final Office Action for U.S. Appl. No. 14/659,371, dated Sep. 25, 2017, 23 pages.

Final Office Action for U.S. Appl. No. 14/659,371, dated May 3, 2018, 21 pages.

Advisory Action for U.S. Appl. No. 14/659,371, dated Aug. 1, 2018, 3 pages.

Non-Final Office Action for U.S. Appl. No. 14/659,292, dated Dec. 21, 2018, 23 pages.

Final Office Action for U.S. Appl. No. 14/659,292, dated Jun. 4, 2019, 24 pages.

Non-Final Office Action for U.S. Appl. No. 14/659,355, dated Oct. 12, 2018, 8 pages.

Final Office Action for U.S. Appl. No. 14/659,355, dated May 2, 2019, 8 pages.

Non-Final Office Action for U.S. Appl. No. 15/886,209, dated May 17, 2019, 7 pages.

Non-Final Office Action for U.S. Appl. No. 14/659,371, dated Feb. 26, 2019, 22 pages.

Non-Final Office Action for U.S. Appl. No. 15/365,295, dated Mar. 29, 2019, 15 pages.

Final Office Action for U.S. Appl. No. 15/365,295, dated Aug. 15, 2019, 11 pages.

(56) References Cited

OTHER PUBLICATIONS

Final Office Action for U.S. Appl. No. 15/467,790, dated Nov. 5, 2018, 15 pages.
Advisory Action for U.S. Appl. No. 15/467,790, dated Feb. 26, 2019, 3 pages.
Notice of Allowance for U.S. Appl. No. 15/467,790, dated May 20, 2019, 8 pages.
Non-Final Office Action for U.S. Appl. No. 15/443,236, dated Nov. 16, 2018, 19 pages.
Final Office Action for U.S. Appl. No. 15/443,236, dated May 30, 2019, 20 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Notice of Allowance for U.S. Appl. No. 15/886,209, dated Sep. 11, 2019, 7 pages.
Notice of Allowance for U.S. Appl. No. 16/402,613, dated Nov. 4, 2019, 9 pages.
Notice of Allowance for U.S. Appl. No. 16/407,397, dated Nov. 12, 2019, 7 pages.
Advisory Action for U.S. Appl. No. 15/365,295, dated Nov. 6, 2019, 3 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.
Notice of Allowance for U.S. Appl. No. 15/365,295, dated Feb. 25, 2020, 8 pages.
Non-Final Office Action for U.S. Appl. No. 16/736,164, dated Feb. 27, 2020, 7 pages.
Final Office Action for U.S. Appl. No. 16/736,164, dated Jun. 2, 2020, 7 pages.
International Search Report and Written Opinion for International Patent Application No. PCT/US2020/012702, dated Apr. 7, 2020, 17 pages.
Awtry, Dan, "Transmitting Data and Power over a One-Wire Bus," Sensors, Feb. 1997, Dallas Semiconductor, 4 pages.
Non-Final Office Action for U.S. Appl. No. 16/599,384, dated Aug. 24, 2020, 8 pages.
Non-Final Office Action for U.S. Appl. No. 16/549,116, dated Aug. 6, 2020, 9 pages.
Office Action for U.S. Appl. No. 16/736,164, dated Sep. 21, 2020, 8 pages.
Final Office Action for U.S. Appl. No. 16/599,384, dated Dec. 1, 2020, 9 pages.
Final Office Action for U.S. Appl. No. 16/736,164, dated Jan. 11, 2021, 10 pages.
Final Office Action for U.S. Appl. No. 16/549,116, dated Jan. 13, 2021, 9 pages.

\* cited by examiner

US 10,983,942 B1

MULTI-MASTER HYBRID BUS APPARATUS

FIELD OF THE DISCLOSURE

The technology of the disclosure relates generally to a hybrid bus apparatus incorporating heterogeneous communication buses.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a radio frequency (RF) signal(s) may first be modulated by a transceiver circuit(s) based on a selected modulation and coding scheme (MCS) and then amplified by a power amplifier(s) prior to being radiated from an antenna(s). In many wireless communication devices, the power amplifier(s) and the antenna(s) are typically located in an RF front-end (RFFE) circuit communicatively coupled to the transceiver circuit(s) via an RFFE bus as defined in the MIPI® alliance specification for radio frequency front-end control interface, version 2.1 (hereinafter referred to as "RFFE specification").

In this regard, FIG. 1 is a schematic diagram of an exemplary RFFE bus apparatus 10 as defined in the RFFE specification. The RFFE bus apparatus 10 includes an RFFE master 12 coupled to a number of RFFE slaves 14(1)-14(M) over an RFFE bus 16. According to the RFFE specification, the RFFE bus 16 is a two-wire serial bus that includes a data line 18 and a clock line 20 for communicating a bidirectional data signal SDATA and a clock signal SCLK, respectively. The RFFE bus 16 operates at a first data rate.

Further according to the RFFE specification, each of the RFFE slaves 14(1)-14(M) is required to have a unique slave identification (USID) and the RFFE bus apparatus 10 can support fifteen (15) USIDs between hexadecimal value 0x1 and hexadecimal value 0xF (0x1-0xF). The RFFE specification further assigns hexadecimal value 0x0 to represent a broadcast slave identification (BSID) for all the RFFE slaves 14(1)-14(M). According to the RFFE specification, each of the RFFE slaves 14(1)-14(M) is assigned one of the 15 USIDs by a system integrator. Accordingly, in the RFFE bus apparatus 10, it is possible to connect up to 15 RFFE slaves 14(1)-14(15) to the RFFE master 12 via the RFFE bus 16.

The RFFE specification also allows any of the 15 USIDs to be used as a group slave identification (GSID) to identify an RFFE slave group. For example, the RFFE bus apparatus 10 includes five RFFE slaves associated with USIDs 0x1-0x5, respectively. The RFFE slaves associated with USIDs 0x1-0x3 may be clustered into a first RFFE slave group and the RFFE slaves associated with USIDs 0x4-0x5 may be clustered into a second RFFE slave group. The first RFFE slave group and the second RFFE slave group may be assigned USIDs 0x6 and 0x7, respectively. In this regard, the USIDs 0x6 and 0x7 are now used as GSIDs to identify the first RFFE slave group and the second RFFE slave group, respectively. Notably, there will be a lesser number of USIDs available to identify the RFFE slaves 14(1)-14(M) if any of the 15 USIDs are used to represent a GSID.

The RFFE master 12 is configured to communicate with the RFFE slaves 14(1)-14(M) based on RFFE command sequences (e.g., register-write command sequence, register-read command sequence, trigger command sequence, etc.). According to the RFFE specification, only the RFFE master 12 can initiate an RFFE command sequence on the RFFE bus 16.

Each of the RFFE command sequences can be associated with a USID, a GSID, or a BSID. When an RFFE command sequence is communicated based on a specific USID, the RFFE command sequence is addressed to a specific RFFE slave among the RFFE slaves 14(1)-14(M) that is identified by the specific USID. When an RFFE command sequence is communicated based on a specific GSID, the RFFE command sequence is addressed to respective RFFE slaves among the RFFE slaves 14(1)-14(M) associated with the specific GSID. For example, if the command sequence is communicated with GSID 0x6, then the command sequence will be addressed to the RFFE slaves associated with the GSID of 0x6. When an RFFE command sequence is communicated based on the BSID, all of the RFFE slaves 14(1)-14(M) on the RFFE bus 16 will be able to receive the RFFE command sequence.

However, not all communications require a two-wire serial bus like the RFFE bus 16. In some cases, a single-wire serial bus may be sufficient or even desired for carrying out certain types of communications between circuits. In this regard, FIG. 2 is a schematic diagram of an exemplary conventional hybrid bus apparatus 22 in which a single-wire bus (SuBUS) bridge circuit 24 is configured to bridge communications between the RFFE master 12 in FIG. 1 with one or more SuBUS slaves 26(1)-26(N). Common elements between FIGS. 1 and 2 are shown therein with common element numbers and will not be re-described herein.

The SuBUS bridge circuit 24 is coupled to the SuBUS slaves 26(1)-26(N) over a SuBUS 28 having a single data wire 30. Accordingly, the SuBUS 28 is configured to operate at a second data rate that can be faster or slower than the first data rate of the RFFE bus 16. The SuBUS bridge circuit 24 may be coupled to the RFFE master 12 via the RFFE bus 16. In this regard, the SuBUS bridge circuit 24 and the SuBUS slaves 26(1)-26(N) are also RFFE slaves, such as the RFFE slaves 14(1)-14(M) coupled to the RFFE master 12 in the RFFE bus apparatus 10 of FIG. 1. In this regard, the SuBUS bridge circuit 24 and the SuBUS slaves 26(1)-26(N) are configured to be identified by the RFFE master 12 based on the 15 USIDs ranging from hexadecimal value 0x1 to hexadecimal value 0xF (0x1-0xF).

Notably, the SuBUS 28 differs from the RFFE bus 16 in several aspects. First, the RFFE bus 16 includes the data line 18 and the clock line 20, while the SuBUS 28 includes only the single data wire 30. Second, the SuBUS bridge circuit 24 is configured to communicate with the SuBUS slaves 26(1)-26(N) based on SuBUS command sequences, which may be compatible but different from the RFFE command sequences communicated over the RFFE bus 16. In this regard, the SuBUS bridge circuit 24 may perform command conversion between the RFFE command sequences and the SuBUS command sequences to facilitate communications between the RFFE bus 16 and the SuBUS 28. Third, the RFFE bus 16 may be configured to operate at the first data rate and the SuBUS 28 may be configured to operate at the second data rate, which is different from the first data rate. In this regard, the SuBUS bridge circuit 24 may buffer SuBUS data payloads prior to communicating over the RFFE bus 16 to help compensate for a difference between the first data rate and the second data rate.

Similar to the RFFE slaves 14(1)-14(M) in FIG. 1, the SuBUS bridge circuit 24 and the SuBUS slaves 26(1)-26(N) need to be respectively identified by a USID. As discussed in FIG. 1, the RFFE bus apparatus 10 can support 15 USIDs between hexadecimal value 0x1 and hexadecimal value 0xF (0x1-0xF). In this regard, the SuBUS bridge circuit 24 can be identified by a specially assigned USID among the 15 available USIDs and the SuBUS slaves 26(1)-26(N) can be identified by the remaining 14 USIDs excluding the specially assigned USID. For example, if the SuBUS bridge circuit 24 is identified by the specially assigned USID of 0x1, then the SuBUS slaves 26(1)-26(N) can only be identified by USIDs ranging from 0x2 to 0xF. Like the RFFE slaves 14(1)-14(M), the SuBUS slaves 26(1)-26(N) may also be accessed via a BSID and a GSID as previously described in FIG. 1.

The conventional hybrid bus apparatus 22 may be employed in combination with the RFFE bus apparatus 10 to enable flexible heterogeneous bus deployment in an electronic device (e.g., a smartphone). However, the SuBUS bridge circuit 24 as presently defined is only capable of bridging the SuBUS slaves 26(1)-26(N) with only a single RFFE master 12. As such, it may be necessary to employ additional SuBUS bridge circuits to bridge the SuBUS slaves 26(1)-26(N) to additional RFFE masters, thus increasing cost and/or footprint of the conventional hybrid bus apparatus 22. Hence, it may be desirable to bridge the SuBUS slaves 26(1)-26(N) to multiple RFFE masters based exclusively on the SuBUS bridge circuit 24.

SUMMARY

Aspects disclosed in the detailed description include a multi-master hybrid bus apparatus. The multi-master hybrid bus apparatus includes a hybrid bus bridge circuit configured to couple multiple master circuits with one or more slave circuits via heterogeneous communication buses. In examples discussed herein, the multiple master circuits can correspond to multiple physically separated master circuits or multiple bus ports provided in a single master circuit. In a non-limiting example, the hybrid bus bridge circuit is coupled to the multiple master circuits via multiple radio frequency front-end (RFFE) buses and to the slave circuits via at least one single-wire bus (SuBUS) consisting of a single wire. By bridging the multiple master circuits to the slave circuits based on a single hybrid bus bridge circuit, it may be possible to enable flexible heterogeneous bus deployment in an electronic device (e.g., a smartphone) with reduced cost and/or footprint.

In one aspect, a multi-master hybrid bus apparatus is provided. The multi-master hybrid bus apparatus includes at least one first primary bus and at least one second primary bus. The first primary bus is a same type of bus as the second primary bus. The multi-master hybrid bus apparatus also includes at least one auxiliary bus. The auxiliary bus is a different type of bus from the first primary bus and the second primary bus. The multi-master hybrid bus apparatus also includes a hybrid bus bridge circuit. The hybrid bus bridge circuit includes at least one first primary bus port coupled to the first primary bus. The hybrid bus bridge circuit also includes at least one second primary bus port coupled to the second primary bus. The hybrid bus bridge circuit also includes at least one auxiliary bus port coupled to the auxiliary bus. The hybrid bus bridge circuit also includes a control circuit. The control circuit is configured to receive at least one first primary bus command sequence and at least one second primary bus command sequence via the first primary bus port and the second primary bus port, respectively. The control circuit is also configured to convert the first primary bus command sequence and the second primary bus command sequence into at least one first auxiliary bus command sequence and at least one second auxiliary bus command sequence, respectively. The control circuit is also configured to provide the first auxiliary bus command sequence and the second auxiliary bus command sequence to the auxiliary bus port.

In another aspect, a hybrid bus bridge circuit is provided. The hybrid bus bridge circuit includes at least one first primary bus port coupled to at least one first primary bus. The hybrid bus bridge circuit also includes at least one second primary bus port coupled to at least one second primary bus. The first primary bus is a same type of bus as the second primary bus. The hybrid bus bridge circuit also includes at least one auxiliary bus port coupled to at least one auxiliary bus. The auxiliary bus is a different type of bus from the first primary bus and the second primary bus. The hybrid bus bridge circuit also includes a control circuit. The control circuit is configured to receive at least one first primary bus command sequence and at least one second primary bus command sequence via the first primary bus port and the second primary bus port, respectively. The control circuit is also configured to convert the first primary bus command sequence and the second primary bus command sequence into at least one first auxiliary bus command sequence and at least one second auxiliary bus command sequence, respectively. The control circuit is also configured to provide the first auxiliary bus command sequence and the second auxiliary bus command sequence to the auxiliary bus port.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
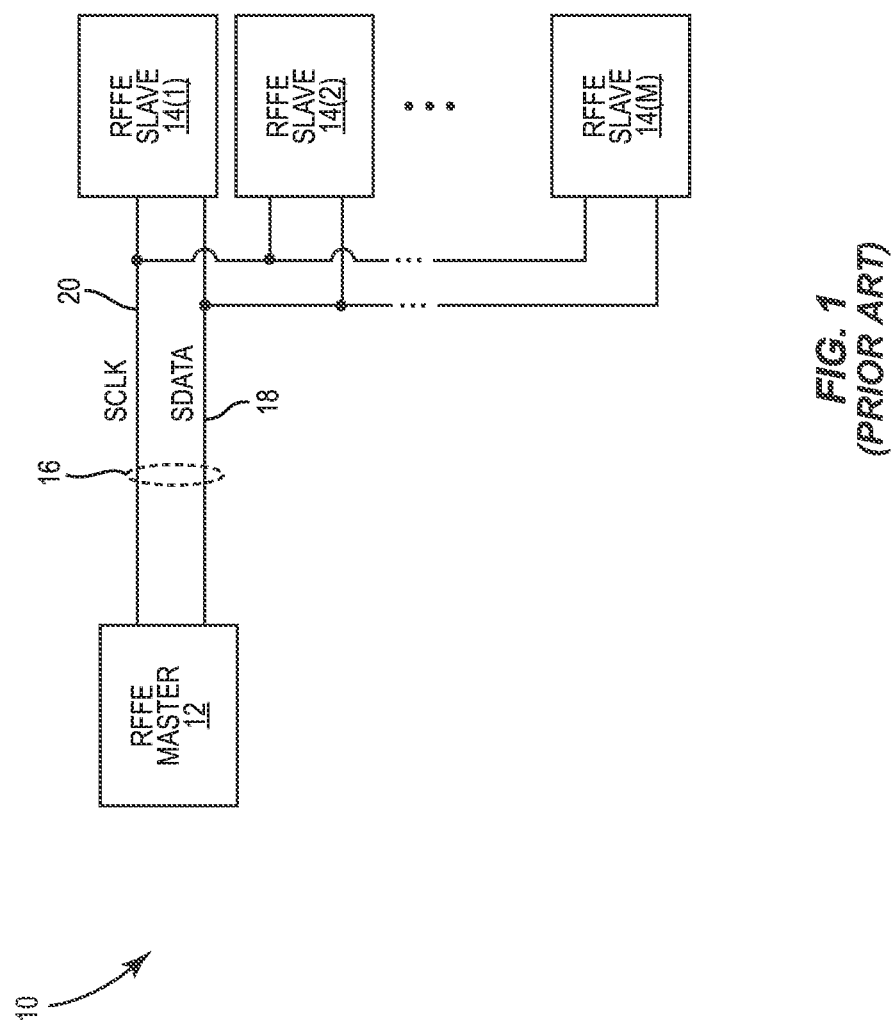
FIG. 1 is a schematic diagram of an exemplary radio frequency front-end (RFFE) bus apparatus as defined in the MIPI® alliance specification for radio frequency (RF) front-end control interface, version 2.1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a multi-master hybrid bus apparatus. The multi-master hybrid bus apparatus includes a hybrid bus bridge circuit configured to couple multiple master circuits with one or more slave circuits via heterogeneous communication buses. In examples discussed herein, the multiple master circuits can correspond to multiple physically separated master circuits or multiple bus ports provided in a single master circuit. In a non-limiting example, the hybrid bus bridge circuit is coupled to the multiple master circuits via multiple radio frequency front-end (RFFE) buses and to the slave circuits via at least one single-wire bus (SuBUS) consisting of a single wire. By bridging the multiple master circuits to the slave circuits based on a single hybrid bus bridge circuit, it may be possible to enable flexible heterogeneous bus deployment in an electronic device (e.g., a smartphone) with reduced cost and/or footprint.

Figure 2:
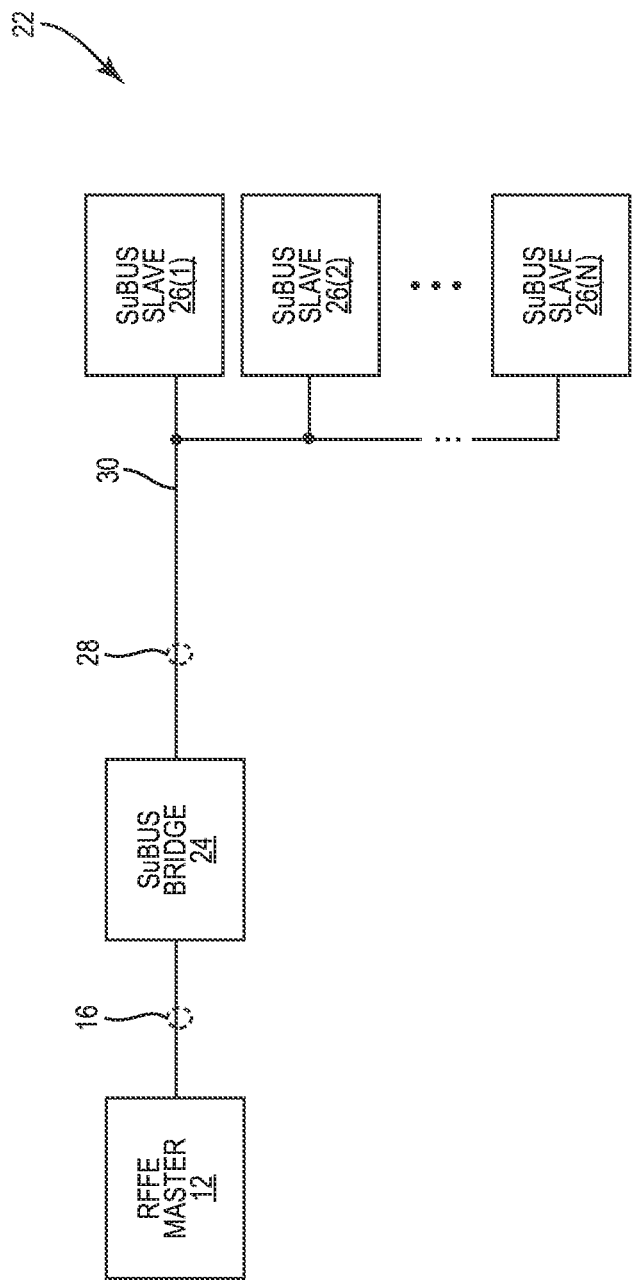
FIG. 2 is a schematic diagram of an exemplary conventional hybrid bus apparatus in which a single-wire bus (SuBUS) bridge circuit is configured to bridge communications between an RFFE master in the RFFE bus apparatus of FIG. 1 with one or more SuBUS slaves.
Figure 3:
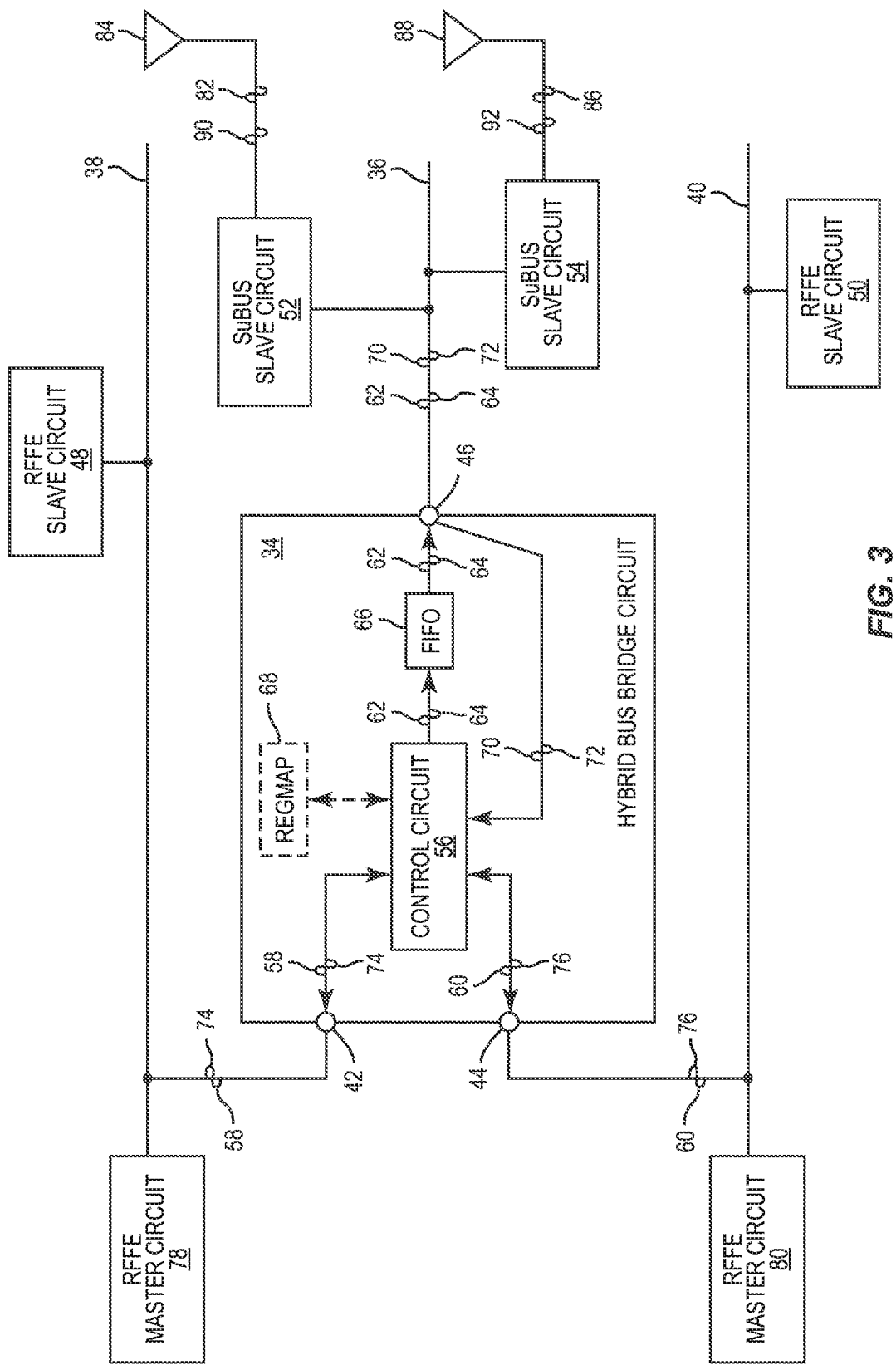
FIG. 3 is a schematic diagram of an exemplary multi-master hybrid bus apparatus including a hybrid bus bridge circuit configured to bridge communications between an auxiliary bus(es) with at least two primary buses that are different from the auxiliary bus(es)

In this regard, FIG. 3 is a schematic diagram of an exemplary multi-master hybrid bus apparatus 32 including a hybrid bus bridge circuit 34 configured to bridge communications between at least one auxiliary bus 36 with at least one first primary bus 38 and at least one second primary bus 40. In contrast to the SuBUS bridge circuit 24 in the conventional hybrid bus apparatus 22 of FIG. 2, the hybrid bus bridge circuit 34 is configured to bridge bidirectional communications between at least two primary buses and at least one auxiliary bus, either concurrently or independently. By employing the hybrid bus bridge circuit 34 to bridge the primary buses with the auxiliary bus, it may be possible to reduce cost and/or footprint of the multi-master hybrid bus apparatus 32, thus enabling flexible heterogeneous bus deployment in an electronic device.

In a non-limiting example, the hybrid bus bridge circuit 34 includes at least one first primary bus port 42, at least one second primary bus port 44, and at least one auxiliary bus port 46. The first primary bus port 42 and the second primary bus port 44 are coupled to the first primary bus 38 and the second primary bus 40, respectively. The first primary bus 38 can be a same type of bus as the second primary bus 40. In a non-limiting example, both the first primary bus 38 and the second primary bus 40 are RFFE buses functionally equivalent to the RFFE bus 16 in FIG. 1. In this regard, the first primary bus 38 (also referred to as "at least one first RFFE bus") and the second primary bus 40 (also referred to as "at least one second RFFE bus") are configured to operate based on the MIPI® alliance specification for radio frequency front-end control interface, version 2.1, as described previously in reference to FIG. 1.

The hybrid bus bridge circuit 34 can be considered a special RFFE slave circuit on both the first primary bus 38 and the second primary bus 40. In this regard, the hybrid bus bridge circuit 34 may be identified by a single unique slave identification (USID), for example USID=0x0, on both the first primary bus 38 and the second primary bus 40. Alternatively, the hybrid bus bridge circuit 34 may also be identified by two different USIDs (e.g., USID=0x0 and USID=0x1) on the first primary bus 38 and the second primary bus 40, respectively.

The first primary bus 38 can be configured to support at least one first RFFE slave circuit 48 and the second primary bus 40 can be configured to support at least one second RFFE slave circuit 50. The first RFFE slave circuit 48 and the second RFFE slave circuit 50 may be identified by at least one first USID and at least one second USID on the first primary bus 38 and the second primary bus 40, respectively. The first USID can be identical to or different from the second USID. Understandably, the first RFFE slave circuit 48 and the second RFFE slave circuit 50 can be associated with an identical USID without causing any potential addressing conflict. This is due to the fact that the first RFFE slave circuit 48 is inaccessible via the second primary bus 40 and the second RFFE slave circuit 50 is inaccessible via the first primary bus 38. However, given that the hybrid bus bridge circuit 34 is coupled to both the first primary bus 38 and the second primary bus 40, the first USID and the second USID must be different from the USID(s) configured to identify the hybrid bus bridge circuit 34. For example, the first RFFE slave circuit 48 and the second RFFE slave circuit 50 can be identified by an identical USID=0x2 or by USID=0x2 and USID=0x3, respectively.

The auxiliary bus 36 is a different type of bus from the first primary bus 38 and the second primary bus 40. In a non-limiting example, the auxiliary bus 36 can be an SuBUS that is functionally equivalent to the SuBUS 28 in FIG. 2. Accordingly, the auxiliary bus 36 (also referred to as "at least one SuBUS") can be configured to support a first SuBUS slave circuit 52 and/or a second SuBUS slave circuit 54 (collectively referred to as "at least one SuBUS slave circuit"). The first SuBUS slave circuit 52 and the second SuBUS slave circuit 54 are identified by respective USIDs (collectively referred to as "at least one USID") that are different from the USID(s) configured to identify the hybrid bus bridge circuit 34 as well as the first RFFE slave circuit 48 and the second RFFE slave circuit 50. For example, the first SuBUS slave circuit 52 and the second SuBUS slave circuit 54 may be identified by USID=0x7 and USID=0x8, respectively.

Notably, the first primary bus port 42, the second primary bus port 44, and the auxiliary bus port 46 are merely non-limiting examples. It should be appreciated that the hybrid bus bridge circuit 34 can be configured to include additional primary bus ports and/or auxiliary bus ports to support additional primary buses and/or auxiliary buses.

The hybrid bus bridge circuit 34 can be configured to include a control circuit 56, which can be implemented by a field-programmable gate array (FPGA), as an example. The control circuit 56 is configured to receive at least one first RFFE command sequence 58 (also referred to as "at least one first primary bus command sequence") and at least one second RFFE command sequence 60 (also referred to as "at least one second primary bus command sequence") via the first primary bus port 42 and the second primary bus port 44, respectively. The first RFFE command sequence 58 and the second RFFE command sequence 60 are collectively referred to as "at least one primary bus command sequence" hereinafter. In a non-limiting example, the first RFFE command sequence 58 and the second RFFE command sequence 60 can be RFFE register-read and register-write command sequences that configure any of the first SuBUS slave circuit 52 and the second SuBUS slave circuit 54 to perform a specific operation(s). Given that the auxiliary bus 36 is a different type of bus from the first primary bus 38 and the second primary bus 40, the control circuit 56 needs to convert the first RFFE command sequence 58 and the second RFFE command sequence 60 into at least one first SuBUS command sequence 62 (also referred to as "at least one first auxiliary bus command sequence") and at least one second SuBUS command sequence 64 (also referred to as "at least one second auxiliary bus command sequence"), respectively. The first SuBUS command sequence 62 and the second SuBUS command sequence 64 are collectively referred to as "at least one auxiliary bus command sequence" hereinafter. More specifically, the control circuit 56 needs to convert the RFFE register-read, register-write, and trigger command sequences into SuBUS register-read and register-write command sequences for distribution over the auxiliary bus 36. The hybrid bus bridge circuit 34 may include a storage medium 66 (e.g., a register bank) configured to provide a first-in first-out (FIFO) queue. As such, the control circuit 56 can be configured to enqueue the first SuBUS command sequence 62 and the second SuBUS command sequence 64 in the storage medium 66 for subsequent distribution via the auxiliary bus port 46.

The first RFFE command sequence 58 and the second RFFE command sequence 60 may arrive at the first primary bus port 42 and the second primary bus port 44 at different times. In this regard, the control circuit 56 can generate and enqueue the first SuBUS command sequence 62 and the second SuBUS command sequence 64 in accordance to an order in which the first RFFE command sequence 58 and the second RFFE command sequence 60 were received.

The first RFFE command sequence 58 and the second RFFE command sequence 60 may also arrive at the first primary bus port 42 and the second primary bus port 44 simultaneously. In this regard, the control circuit 56 can generate and enqueue the first SuBUS command sequence 62 and the second SuBUS command sequence 64 in accordance to a predefined priority among the first primary bus port 42 and the second primary bus port 44. The hybrid bus bridge circuit 34 may include a priority register 68 (denoted as "REGMAP") configured to establish the predefined priority. In a non-limiting example, the second primary bus port 44 is configured to have a higher priority over the first primary bus port 42. In this regard, the control circuit 56 is configured to enqueue the second SuBUS command sequence 64 after the first SuBUS command sequence 62. As such, if the first SuBUS command sequence 62 and the second SuBUS command sequence 64 are both destined to the first SuBUS slave circuit 52 as an example, the second SuBUS command sequence 64 can effectively overwrite the first SuBUS command sequence 62.

The control circuit 56 may also receive at least one first SuBUS data payload 70 (also referred to as "at least one first auxiliary data payload") and at least one second SuBUS data payload 72 (also referred to as "at least one second auxiliary data payload") via the auxiliary bus port 46. In this regard, the control circuit 56 is configured to convert the first SuBUS data payload 70 and the second SuBUS data payload 72 into at least one first RFFE data payload 74 (also referred to as "at least one first bus data payload") and at least one second RFFE data payload 76 (also referred to as "at least one second bus data payload"), respectively. Accordingly, the control circuit 56 can provide the first RFFE data payload 74 and the second RFFE data payload 76 to the first primary bus port 42 and the second primary bus port 44, respectively.

The multi-master hybrid bus apparatus 32 can include at least one first master circuit 78 and at least one second master circuit 80 coupled to the first primary bus 38 and the second primary bus 40, respectively. In a non-limiting example, the first master circuit 78 is also a first RFFE master circuit configured to communicate with the first RFFE slave circuit 48 directly via the first primary bus 38 and communicate with the first SuBUS slave circuit 52 and/or the second SuBUS slave circuit 54 via the hybrid bus bridge circuit 34. Likewise, the second master circuit 80 is also a second RFFE master circuit configured to communicate with the second RFFE slave circuit 50 directly via the second primary bus 40 and communicate with the first SuBUS slave circuit 52 and/or the second SuBUS slave circuit 54 via the hybrid bus bridge circuit 34.

In one non-limiting example, the first SuBUS slave circuit 52 can be a transmit circuit configured to transmit an RF transmit signal 82 via a first coupled antenna 84 and the second SuBUS slave circuit can be a receive circuit configured to receive an RF receive signal 86 via a second coupled antenna 88. In this regard, the first master circuit 78 and the second master circuit 80 can be configured to support an RF transmit function and an RF receive function, respectively. Accordingly, the first master circuit 78 and the second master circuit 80 can configure the first SuBUS slave circuit 52 and the second SuBUS slave circuit 54 based on the RF transmit function and the RF receive function, respectively.

In another non-limiting example, the first SuBUS slave circuit 52 can be a first transceiver circuit configured to communicate (e.g., transmit and receive) a first RF signal 90 via the first coupled antenna 84 and the second SuBUS slave circuit can be a second transceiver circuit configured to communicate a second RF signal 92 via the second coupled antenna 88. The first RF signal 90 and the second RF signal 92 may be communicated in different RF bands to enable carrier aggregation and/or multiple-input multiple-output (MIMO) spatial multiplexing operations. The first RF signal 90 and the second RF signal 92 may also be communicated in an identical RF band to enable MIMO diversity and/or RF beamforming operations.

In this regard, the first master circuit 78 and the second master circuit 80 can be configured to support a first RF transmit/receive function and a second RF transmit/receive function, respectively. Accordingly, the first master circuit 78 and the second master circuit 80 can configure the first SuBUS slave circuit 52 and the second SuBUS slave circuit 54 based on the first RF transmit/receive function and the second RF transmit/receive function, respectively.

Figure 4:
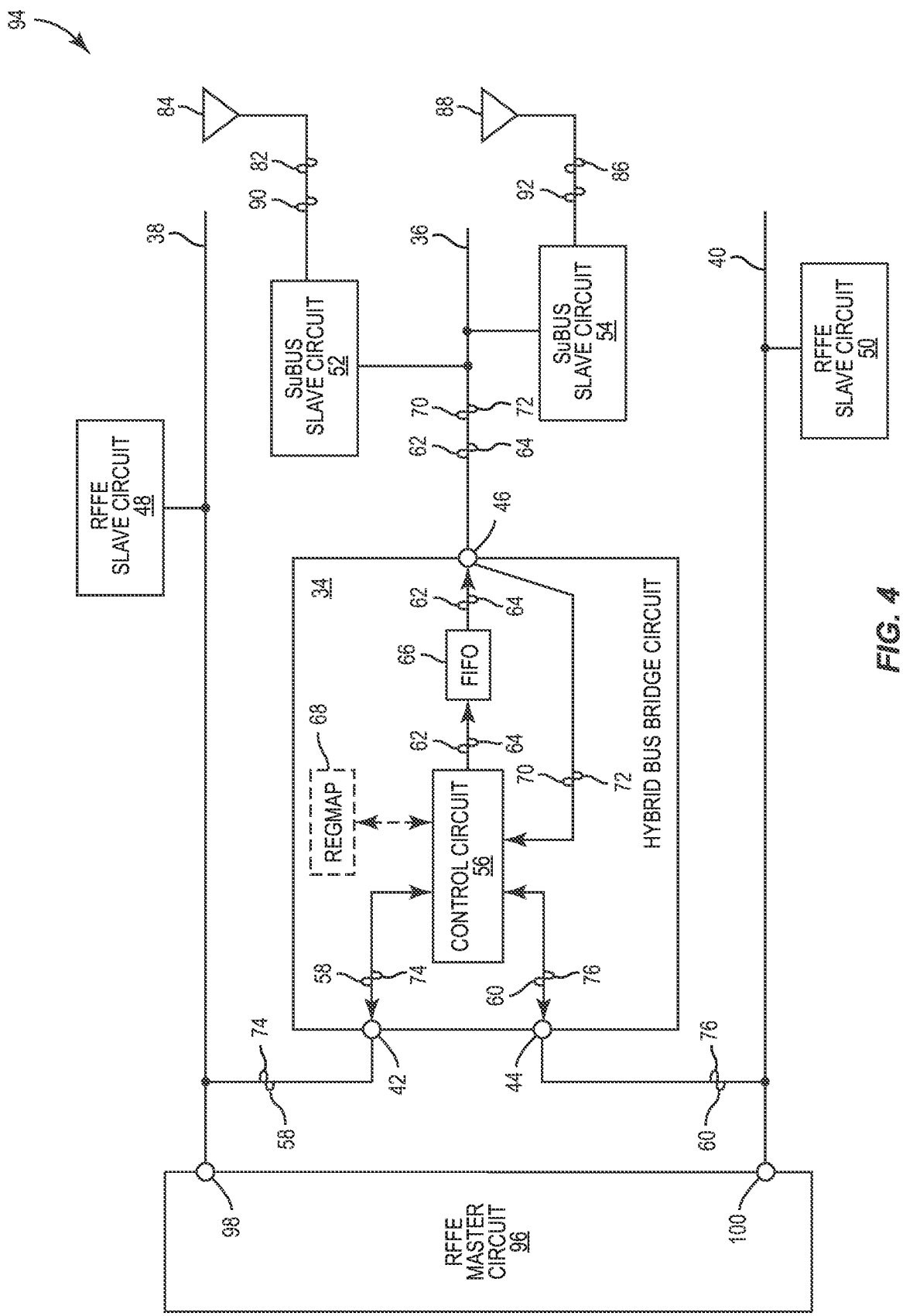
FIG. 4 is a schematic diagram of an exemplary multi-master hybrid bus apparatus configured according to an alternative embodiment of the present disclosure.

Alternative to coupling the first primary bus 38 and the second primary bus 40 to the first master circuit 78 and the second master circuit 80, it may also be possible to couple the first primary bus 38 and the second primary bus 40 to different bus ports in a single master circuit. In this regard, FIG. 4 is a schematic diagram of an exemplary multi-master hybrid bus apparatus 94 configured according to another embodiment of the present disclosure. Common elements between FIGS. 3 and 4 are shown therein with common element numbers and will not be re-described herein.

The multi-master hybrid bus apparatus 94 includes at least one master circuit 96. The master circuit 96 includes at least one first master bus port 98 and at least one second master bus port 100 that are coupled to the first primary bus 38 and the second primary bus 40, respectively. In this regard, the first master bus port 98 and the second master bus port 100 may be considered as being equivalent to the first master circuit 78 and the second master circuit 80 in the multi-master hybrid bus apparatus 32 of FIG. 3, respectively.

Those skilled in the art will recognize improvements and modifications to the embodiments of the present disclosure. All such improvements and modifications are considered within the scope of the concepts disclosed herein and the claims that follow.

What is claimed is:

1. A multi-master hybrid bus apparatus comprising:
   at least one first primary bus and at least one second primary bus, wherein the at least one first primary bus is a same type of bus as the at least one second primary bus;
   at least one auxiliary bus consisting of one wire, wherein the at least one auxiliary bus is a different type of bus from the at least one first primary bus and the at least one second primary bus; and
   a hybrid bus bridge circuit comprising:
      at least one first primary bus port coupled to the at least one first primary bus;
      at least one second primary bus port coupled to the at least one second primary bus;
      at least one auxiliary bus port coupled to the at least one auxiliary bus; and
      a control circuit configured to:
         receive at least one first primary bus command sequence and at least one second primary bus command sequence via the at least one first primary bus port and the at least one second primary bus port, respectively;
         convert the at least one first primary bus command sequence and the at least one second primary bus command sequence into at least one first auxiliary bus command sequence and at least one second auxiliary bus command sequence, respectively; and
         provide the at least one first auxiliary bus command sequence and the at least one second auxiliary bus command sequence to the at least one auxiliary bus port.

2. The multi-master hybrid bus apparatus of claim 1 further comprising:
   at least one first master circuit coupled to the at least one first primary bus; and
   at least one second master circuit coupled to the at least one second primary bus.

3. The multi-master hybrid bus apparatus of claim 1 further comprising at least one master circuit comprising:
   at least one first master bus port coupled to the at least one first primary bus; and
   at least one second master bus port coupled to the at least one second primary bus.

4. The multi-master hybrid bus apparatus of claim 1 wherein the control circuit is further configured to:
   receive the at least one first primary bus command sequence and the at least one second primary bus command sequence concurrently;
   convert the at least one first primary bus command sequence and the at least one second primary bus command sequence into the at least one first auxiliary bus command sequence and the at least one second auxiliary bus command sequence, respectively; and
   provide the at least one first auxiliary bus command sequence and the at least one second auxiliary bus command sequence to the at least one auxiliary bus port based on a predefined priority among the at least one first primary bus port and the at least one second primary bus port.

5. The multi-master hybrid bus apparatus of claim 4 wherein the hybrid bus bridge circuit further comprises a first-in first-out (FIFO) queue configured to output the at least one first auxiliary bus command sequence and the at least one second auxiliary bus command sequence to the at least one auxiliary bus port, wherein the control circuit is further configured to enqueue the at least one first auxiliary bus command sequence and the at least one second auxiliary bus command sequence in the FIFO queue based on the predefined priority.

6. The multi-master hybrid bus apparatus of claim 4 wherein the control circuit is further configured to:
   receive at least one first auxiliary data payload and at least one second auxiliary data payload via the at least one auxiliary bus port;

convert the at least one first auxiliary data payload and the at least one second auxiliary data payload into at least one first bus data payload and at least one second bus data payload, respectively; and provide the at least one first bus data payload and the at least one second bus data payload to the at least one first primary bus port and the at least one second primary bus port, respectively.

7. The multi-master hybrid bus apparatus of claim 1 wherein:

the at least one auxiliary bus comprises at least one single-wire bus (SuBUS) consisting of the one wire;

the at least one first primary bus comprises at least one first radio frequency (RF) front-end (RFFE) bus; and the at least one second primary bus comprises at least one second RFFE bus.

8. The multi-master hybrid bus apparatus of claim 7 further comprising at least one SuBUS slave circuit coupled to the at least one SuBUS and identified by at least one unique slave identification (USID).

9. The multi-master hybrid bus apparatus of claim 8 wherein:

the at least one SuBUS slave circuit comprises:

a transmit circuit configured to transmit an RF transmit signal via a first coupled antenna; and a receive circuit configured to receive an RF receive signal via a second coupled antenna; and the control circuit is further configured to:

receive at least one first RFFE command sequence for programming the transmit circuit via the at least one first primary bus port;

receive at least one second RFFE command sequence for programming the receive circuit via the at least one second primary bus port;

convert the at least one first RFFE command sequence and the at least one second RFFE command sequence into at least one first SuBUS command sequence and at least one second SuBUS command sequence, respectively; and provide the at least one first SuBUS command sequence and the at least one second SuBUS command sequence to the transmit circuit and the receive circuit via the at least one auxiliary bus port, respectively.

10. The multi-master hybrid bus apparatus of claim 9 wherein the control circuit is further configured to:

receive at least one first SuBUS data payload and at least one second SuBUS data payload from the transmit circuit and the receive circuit, respectively;

convert the at least one first SuBUS data payload and the at least one second SuBUS data payload into at least one first RFFE data payload and at least one second RFFE data payload, respectively; and provide the at least one first RFFE data payload and the at least one second RFFE data payload to the at least one first primary bus port and the at least one second primary bus port, respectively.

11. The multi-master hybrid bus apparatus of claim 8 wherein:

the at least one SuBUS slave circuit comprises:

a first transceiver circuit configured to communicate a first RF signal via a first coupled antenna; and a second transceiver circuit configured to communicate a second RF signal via a second coupled antenna; and the control circuit is further configured to:

receive at least one first RFFE command sequence configured for programming the first transceiver circuit via the at least one first primary bus port;

receive at least one second RFFE command sequence for programming the second transceiver circuit via the at least one second primary bus port;

convert the at least one first RFFE command sequence and the at least one second RFFE command sequence into at least one first SuBUS command sequence and at least one second SuBUS command sequence, respectively; and provide the at least one first SuBUS command sequence and the at least one second SuBUS command sequence to the first transceiver circuit and the second transceiver circuit via the at least one auxiliary bus port, respectively.

12. The multi-master hybrid bus apparatus of claim 11 wherein the control circuit is further configured to:

receive at least one first SuBUS data payload and at least one second SuBUS data payload from the first transceiver circuit and the second transceiver circuit, respectively;

convert the at least one first SuBUS data payload and the at least one second SuBUS data payload into at least one first RFFE data payload and at least one second RFFE data payload, respectively; and provide the at least one first RFFE data payload and the at least one second RFFE data payload to the at least one first primary bus port and the at least one second primary bus port, respectively.

13. The multi-master hybrid bus apparatus of claim 8 further comprising:

at least one first RFFE slave circuit coupled exclusively to the at least one first RFFE bus and identified by at least one first USID different from the at least one USID identifying the at least one SuBUS slave circuit; and at least one second RFFE slave circuit coupled exclusively to the at least one second RFFE bus and identified by at least one second USID different from the at least one USID identifying the at least one SuBUS slave circuit.

14. The multi-master hybrid bus apparatus of claim 13 wherein the at least one first RFFE slave circuit and the at least one second RFFE slave circuit are configured to communicate RFFE command sequences and RFFE data payloads via the at least one first RFFE bus and the at least one second RFFE bus, respectively, independent of the hybrid bus bridge circuit.

15. The multi-master hybrid bus apparatus of claim 13 wherein the at least one first USID is identical to the at least one second USID.

16. The multi-master hybrid bus apparatus of claim 13 wherein the at least one first USID is different from the at least one second USID.

17. A hybrid bus bridge circuit comprising:

at least one first primary bus port coupled to at least one first primary bus;

at least one second primary bus port coupled to at least one second primary bus, wherein the at least one first primary bus is a same type of bus as the at least one second primary bus;

at least one auxiliary bus port coupled to at least one auxiliary bus consisting of one wire, wherein the at least one auxiliary bus is a different type of bus from the at least one first primary bus and the at least one second primary bus; and a control circuit configured to:

receive at least one first primary bus command sequence and at least one second primary bus command sequence via the at least one first primary bus port and the at least one second primary bus port, respectively;

convert the at least one first primary bus command sequence and the at least one second primary bus command sequence into at least one first auxiliary bus command sequence and at least one second auxiliary bus command sequence, respectively; and provide the at least one first auxiliary bus command sequence and the at least one second auxiliary bus command sequence to the at least one auxiliary bus port.

18. The hybrid bus bridge circuit of claim 17 wherein the control circuit is further configured to:

receive the at least one first primary bus command sequence and the at least one second primary bus command sequence concurrently;

convert the at least one first primary bus command sequence and the at least one second primary bus command sequence into the at least one first auxiliary bus command sequence and the at least one second auxiliary bus command sequence, respectively; and provide the at least one first auxiliary bus command sequence and the at least one second auxiliary bus command sequence to the at least one auxiliary bus port based on a predefined priority among the at least one first primary bus port and the at least one second primary bus port.

19. The hybrid bus bridge circuit of claim 18 further comprising a first-in first-out (FIFO) queue configured to output the at least one first auxiliary bus command sequence and the at least one second auxiliary bus command sequence to the at least one auxiliary bus port, wherein the control circuit is further configured to enqueue the at least one first auxiliary bus command sequence and the at least one second auxiliary bus command sequence in the FIFO queue based on the predefined priority.

20. The hybrid bus bridge circuit of claim 18 wherein the control circuit is further configured to:

receive at least one first auxiliary data payload and at least one second auxiliary data payload via the at least one auxiliary bus port;

convert the at least one first auxiliary data payload and the at least one second auxiliary data payload into at least one first bus data payload and at least one second bus data payload, respectively; and provide the at least one first bus data payload and the at least one second bus data payload to the at least one first primary bus port and the at least one second primary bus port, respectively.

* * * * *